US011665562B2

(12) United States Patent
Smith

(10) Patent No.: US 11,665,562 B2
(45) Date of Patent: May 30, 2023

(54) REAL-TIME NETWORK CONDITION ESTIMATIONS FOR MOBILE DEVICES

(71) Applicant: T-Mobile USA, Inc., Bellevue, WA (US)

(72) Inventor: Jeffery Smith, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 302 days.

(21) Appl. No.: 16/888,594

(22) Filed: May 29, 2020

(65) Prior Publication Data

US 2021/0377761 A1 Dec. 2, 2021

(51) Int. Cl.
*H04W 24/08* (2009.01)
*H04W 80/12* (2009.01)

(52) U.S. Cl.
CPC ............ *H04W 24/08* (2013.01); *H04W 80/12* (2013.01)

(58) Field of Classification Search
CPC .................................................... H04W 24/08
See application file for complete search history.

(56) References Cited

U.S. PATENT DOCUMENTS

| 10,924,347 | B1* | 2/2021 | Narsian | H04L 47/12 |
| 2015/0134809 | A1* | 5/2015 | Tofighbakhsh | H04L 69/321 |
| | | | | 709/224 |
| 2016/0242053 | A1* | 8/2016 | Leontiadis | H04W 24/10 |
| 2017/0013514 | A1* | 1/2017 | Tseng | H04W 36/0022 |
| 2018/0205812 | A1* | 7/2018 | Peterson | H04M 1/6058 |
| 2020/0374974 | A1* | 11/2020 | Sun | H04L 41/20 |
| 2021/0146240 | A1* | 5/2021 | Colenbrander | A63F 13/355 |
| 2022/0158787 | A1* | 5/2022 | Lee | H04W 72/0453 |

* cited by examiner

*Primary Examiner* — Abdeltif Ajid
(74) *Attorney, Agent, or Firm* — Perkins Coie LLP

(57) ABSTRACT

Methods, apparatus, and systems for providing deterministic network experience to application-level services are disclosed. In one example aspect, a method includes providing a set of interfaces to an application-level service deployed in part on a user device. The set of interfaces is configured to provide a notification to the application-level service regarding a real-time change in network conditions relevant to the application-level service. The method also includes receiving a registration request from the application-level service to register for the notification, estimating the network conditions based on physical layer information, and notifying the registered application-level service of the change in the network conditions based on the estimated network conditions.

18 Claims, 4 Drawing Sheets

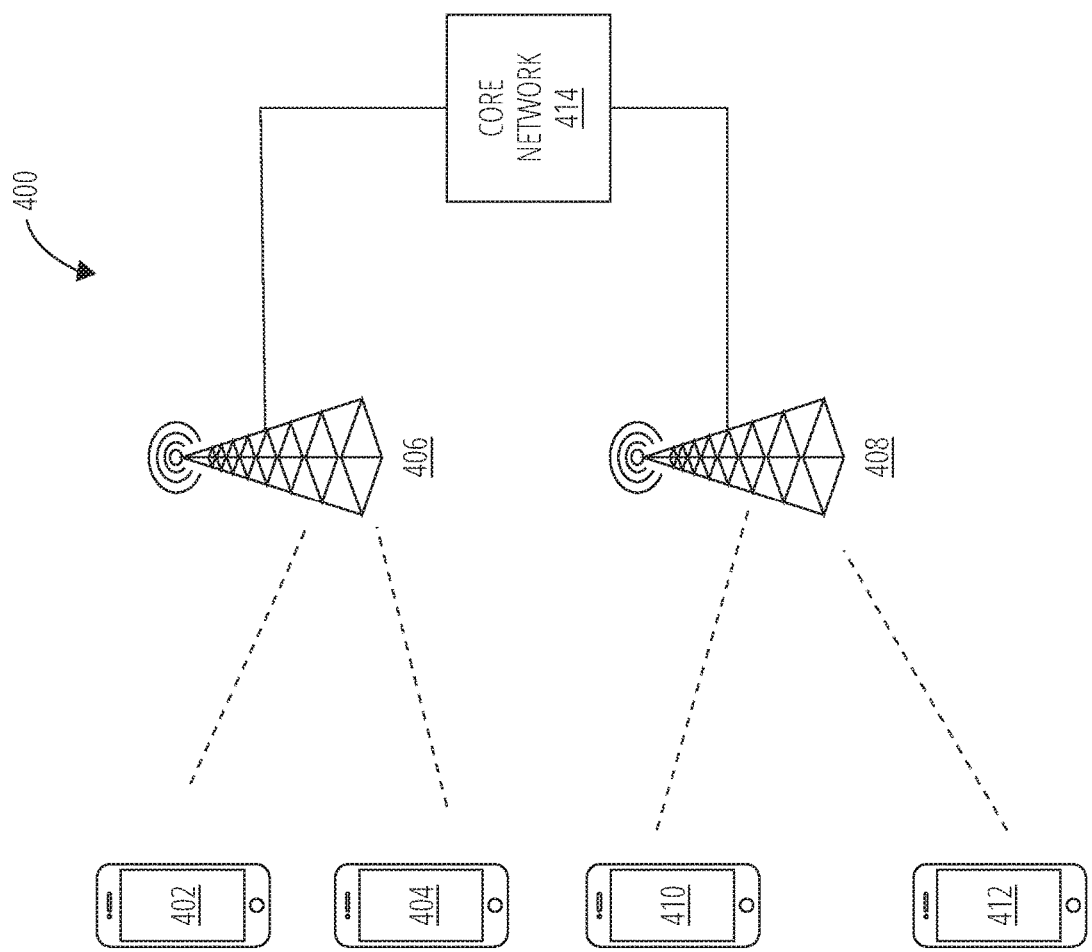

REAL-TIME NETWORK CONDITION ESTIMATIONS FOR MOBILE DEVICES

BACKGROUND

Network congestion in data networking is the reduced quality of service that occurs when a network node or link is carrying more data than it can handle. Network congestion can result in queueing delay, packet loss, or the blocking of new connections. Networks, such as wireless cellular networks, use congestion control or congestion avoidance techniques to try to avoid such negative impact of network congestion. However, advancement in cellular access technologies presents challenges for congestion control or congestion avoidance techniques to adapt to the fast-changing network environment in real-time.

BRIEF DESCRIPTION OF THE DRAWINGS

Embodiments of the disclosed technology are described and explained through the use of the accompanying drawings.

FIG. 4 shows an example of a wireless communication system where techniques in accordance with one or more embodiments of the present technology can be applied.

Figure 1:
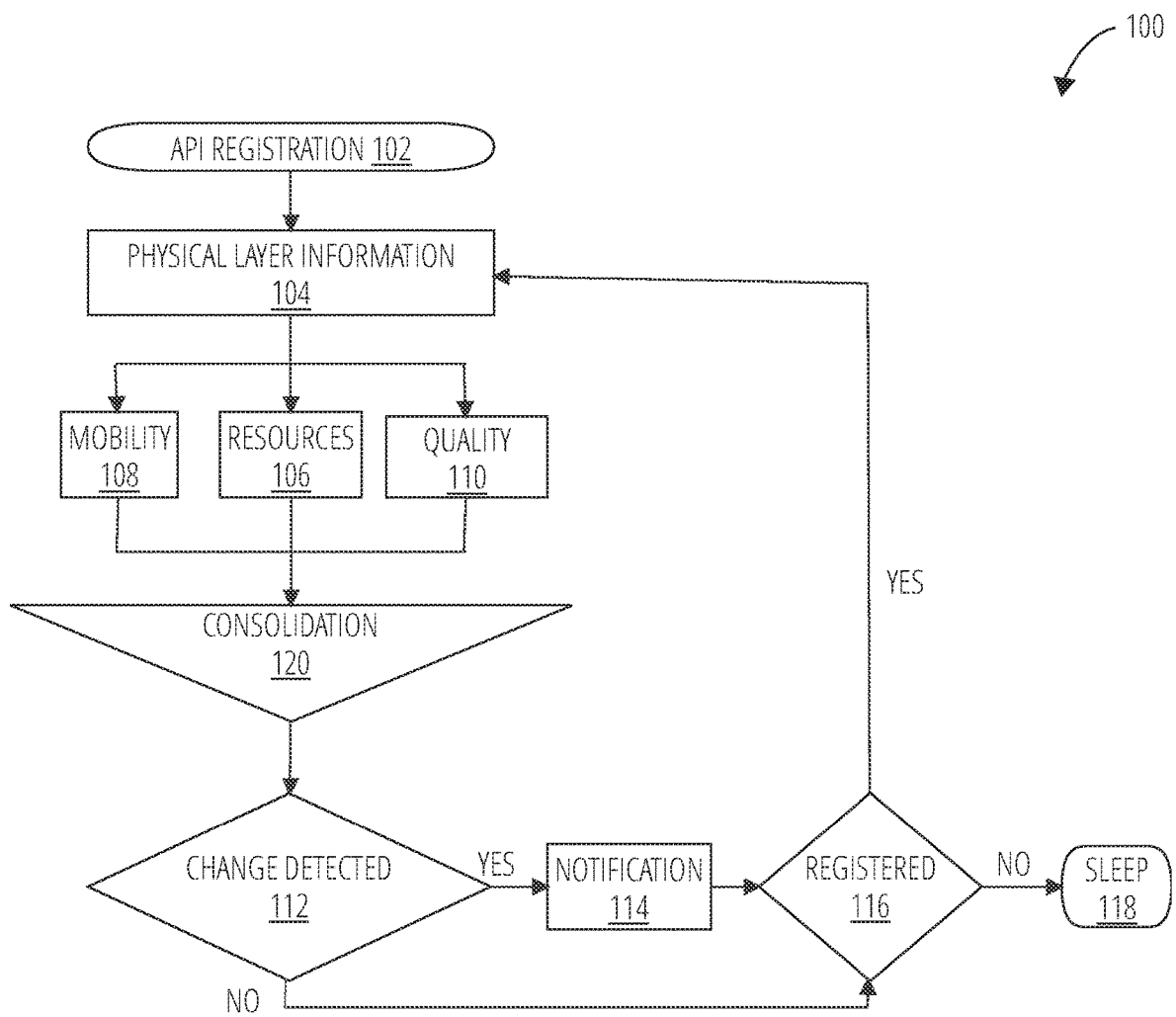
FIG. 1 illustrates example operations performed by a congestion control module in accordance with one or more embodiments of the disclosed technology.

The drawings have not necessarily been drawn to scale. Similarly, some components and/or operations can be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Congestive collapse is the condition in which congestion prevents or limits communication in the networks. When a network is in this condition, it suffers from high traffic demand, yet throughput is low, thereby causing packet delay and poor quality of service. To avoid congestive collapse, congestion control modulates traffic entry into the network. This is typically accomplished by reducing the rate of packets. Conventionally, to avoid congestive collapse, Transmission Control Protocol (TCP) uses a multi-faceted congestion-control strategy. For each connection, TCP maintains a congestion window, limiting the total number of unacknowledged packets that can be in transit. TCP then increases the congestion window when appropriate. In some cases, for every packet acknowledged, the congestion window effectively doubles for every round-trip time (RTT). When the congestion window exceeds a threshold (e.g., the slow-start threshold), the algorithm enters the congestion avoidance state.

With the advancement of cellular technologies and the overwhelming popularity of mobile devices, a large percentage of network content is being delivered via cellular links. Furthermore, the Fifth-Generation (5G) New Radio (NR) technology is now aiming to provide ultra-reliable low latency (URLLC) communications to enable many real-time communication services, such as factory automation, and/or autonomous driving.

Cellular technologies typically conceal link layer losses by deploying error correction techniques, potentially at the cost of large variations in packet delay. Users may experience a significant degree of variation in link-layer data rates because of the nature of wireless signal propagation and channel-state-based scheduling. The combined delay and rate variability can lead to undesirable interactions with the TCP protocol. Existing studies have shown that TCP cannot adapt quickly enough to the delay and bandwidth fluctuations of cellular links. Thus, the congestion avoidance mechanisms at the TCP or User Datagram Protocol (UDP) layer do not perform well in fast-changing cellular network environments to provide deterministic user experiences. For example, real-time services, such as real-time game streaming, need a sub-RTT view of available resources in the network to ensure an uninterrupted user experience. This is currently not feasible using conventional TCP-based congestion control and avoidance techniques.

The inventors have recognized that directly obtaining bandwidth information from the physical layer signaling between the UE and the base station eliminates the need for a TCP and/or UDP model and the associated uncertainty. Estimations based on physical layer information do not rely on packet loss signals and avoid issues prevalent in TCP-based protocols. Furthermore, the high fidelity of information at the physical layer allows real-time tracking of fast-changing cellular network conditions. However, information from the physical layer signaling is typically only visible to the operating system of the mobile devices. Such information is not readily available to application-level services deployed or installed on the mobile devices, the very services that need to understand the status of a network or connection where those services rely on URLLC.

This patent document discloses techniques that can be implemented in various embodiments to provide deterministic network experience to application level services deployed at mobile devices. In some embodiments, a congestion control module obtains information from the operating system to covey information about network conditions. The module collects information based on physical layer signaling that is typically invisible to application-level services. The module can also obtain information from the mobile network that is otherwise unexposed to other services. For example, the module can query the mobile network to obtain reports about the estimated congestion level for various sites. Information in the reports can be combined with local measurements to provide a more accurate estimation of available resources and network conditions. The network operators can provide not only the module congestion control, but also a set of application programming interfaces (APIs) to allow application-level services to communicate with the module. Application-level services can register via the APIs to get notifications of network condition changes. The application-level services can further obtain relevant physical-layer information that is conventionally not exposed, thereby allowing the application-level services to adapt quickly according to the network conditions to avoid jitter or latency caused by network congestions.

FIG. 1 illustrates a flowchart of example operations 100 performed by a congestion control module in accordance with embodiments of the disclosed technology. At operation 102, an application-level service, deployed at least partially on a mobile device, sends a registration request to the congestion control module via a set of APIs. In some embodiments, for application-level services that are in-part deployed on Android devices, they can register with the congestion control module by passing an Intent (that is, an abstract description of an operation to be performed). For example, a real-time gaming service includes a server-side component and a client-side application. The client-side application that is installed on a mobile device can send a registration request to a congestion control module deployed on the mobile device using the set of APIs (e.g., Intent). After the application-level service completes the registration, the service can receive real-time notifications from the congestion control module when network conditions change. Furthermore, the application-level service can obtain relevant physical-layer information to allow the service to make appropriate changes to adapt to the changes. Table 1 shows an example of physical layer information that the application-level service can obtain.

TABLE 1

Example Physical Layer Information
for Application-Level Services

| Field | Value |
|---|---|
| Bandwidth High | 33000 |
| Bandwidth Average | 21000 |
| Bandwidth Low | 14000 |
| Retransmissions | 0.01 |
| Handover | False |
| Reference Signal Received Quality (RSRQ) | −97 |
| Reference Signal Received Power (RSRP) | −11 |
| Congested Level | low |

In some embodiments, the application-level service can register with the module requesting specific parameters that it needs. Alternatively or additionally, the application-level service can provide expected thresholds/values for the specific parameters. The module can notify the application service when the expected thresholds/values are met or not met. Table 2 shows an example of parameters that the application-level service registers, along with corresponding expected values. The application-level service is then notified when the minimum bandwidth falls below the expected level, a handover occurs, and/or network latency is detected.

TABLE 2

Example Parameters Monitored by Application-Level Services

| Minimum Bandwidth | 1500 |
|---|---|
| Handover | True |
| Latency | True |

When the module detects that values of the parameters are not consistent with the expectations of the application service, the module sends a notification indicating so. Table 3 shows an example notification that the module sends to the application-level server.

TABLE 3

Example Notification from the Module

| Timestamp start | 155555555 |
|---|---|
| Requirements Met | False |
| Expires | 5 |

The congestion control module can be deployed on the mobile device as a software program. In some embodiments, the congestion control module can intercept physical layer signaling between the mobile device and the base station to collect physical layer information 104 directly. For example, the congestion control module obtains information from Channel State Information (CSI) reporting or signaling information in Downlink Control Information (DCI) messages to determine the network conditions. As another example, the congest control module obtains measurement reports and inter/intra-cell handover information in Radio Resource Control (RRC) messages (e.g., RRC Reconfiguration requests/responses). The measurement reports include measurements for both the serving cell and neighboring cells. The congestion control module can estimate mobility and handover conditions based on such measurement reports. Furthermore, the RRC messages enable the congestion control module to determine the exact moment when a handover is triggered and why the handover is triggered, thereby allowing the congestion control module to notify the relevant application-level services accordingly.

The congestion control module can also obtain relevant physical layer information 104 from the operating system of the mobile device to perform subsequent determination of the network conditions. The physical layer information 104 includes information such as RSRP, RSRQ, channel quality indication (CQI), Modulation and Coding Scheme (MCS), link retransmissions, or any combinations thereof. For example, uplink retransmissions can be calculated by capturing the transmission reports on the Physical Uplink Shared Channel (PUSCH). Downlink retransmissions can be calculated by capturing statistics on the Physical Downlink Shared Channel (PDSCH) and extracting the redundancy version (RV) and Hybrid Automatic Repeat Request (HARQ) identifier (ID). As another example, throughput information includes at least channel bandwidth, MCS, transport block size, the number of resource blocks, or any combination thereof. Such information can facilitate an estimation of mobility 108 (e.g., whether a handover is about to happen due to movement of the mobile device), available resources 106 (e.g., bandwidth estimation), and/or channel state and quality 110 (e.g., quality of services).

The collected physical layer information 104 is consolidated into a consolidated output at operation 120. The consolidated output enables the congestion control module to detect, at operation 112, whether network conditions have changed or are likely to change. If no change has been detected, the congestion control module checks, at operation 116, whether the application-level service is registered. The congestion control module may temporarily go into a sleep state at operation 118 if the service is not registered to receive any notification or relevant information. If a change in network conditions is detected, the congestion control module prepares, at operation 114, a notification to the service. The notification is then transmitted to the registered service.

The information included in the notification can be as simple as a binary value indicating whether a change has been detected. The notification can include additional information about the detected network condition change based on physical-layer statistics. For example, the notification can indicate different data rates, e.g., fast, medium, or slow. The information included in the notification can also be tailored for different types of services having different types of traffic, such as real-time traffic, non-real-time data transfers, or background data transmissions. For example, for services requiring lots of real-time traffic, the notification can include information indicating that the service should constrain the maximum bandwidth (e.g., imposing a bandwidth cap) for fewer service interruptions. For services that perform large non-real-time data transfers, the notification can include the estimated maximum bandwidth to allow faster and more efficient data transform. For other types of services, the notification can provide information regarding when data transmission can be performed efficiently with low packet loss.

Figure 2:
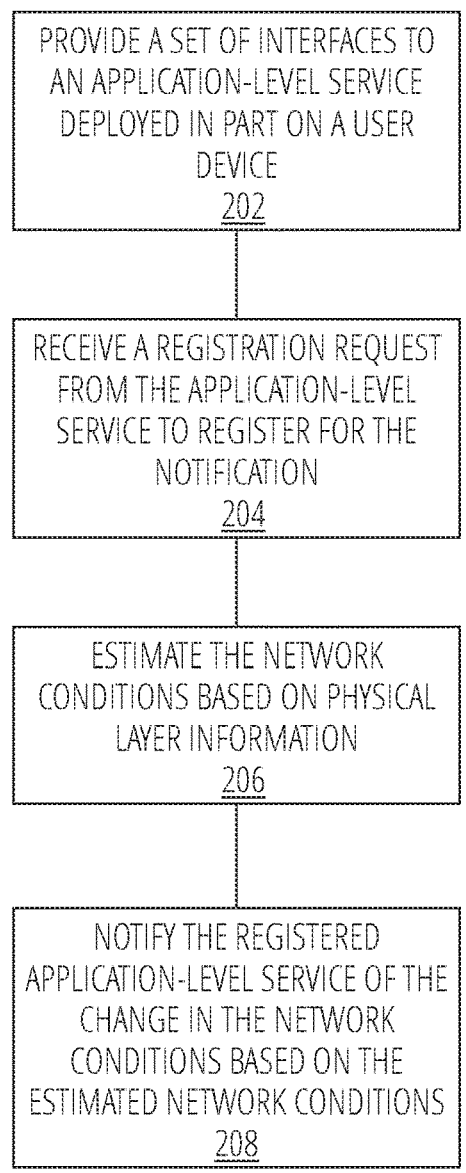
FIG. 2 is a flowchart representation of a method for providing deterministic network experience to application-level services in accordance with one or more embodiments of the disclosed technology.

FIG. 2 is a flowchart representation of a method 200 for providing deterministic network experiences to application-level services in accordance with embodiments of the present technology. The method 200 includes, at operation 202, providing a set of interfaces to an application-level service deployed in part on a user device. The set of interfaces is configured to provide a notification to the application-level service regarding a real-time change in network conditions relevant to the application-level service. The method 200 includes, at operation 204, receiving a registration request from the application-level service to register for the notification. The method 200 includes, at operation 206, estimating the network conditions based on physical layer information. The method 200 also includes, at operation 208, notifying the registered application-level service of the change in the network conditions based on the estimated network conditions.

In some embodiments, the application-level service comprises a real-time service that requires high bandwidth and low latency. For example, the application-level service can be a real-time gaming service or an autonomous driving service.

In some embodiments, the method 200 includes obtaining the physical layer information from an operating system of the user device. For example, the congestion control module can communicate with the operating system of the user device to obtain physical layer signaling. The congestion control module can then derive relevant information based on the physical layer signaling. In some embodiments, the method 200 includes obtaining the physical layer information a base station that is in communication with the user device. For example, the base station can send relevant information directly to the user device. In those cases, the congestion control module can obtain such information based on the messages from the base station directly.

In some embodiments, the network conditions comprise at least one of (1) an upcoming mobility event (such as a handover event), (2) an amount of available network resources, (3) or a channel quality. The change in the network conditions can indicate a service interruption to the application-level service. For example, an upcoming handover event can interrupt a real-time gaming service when the user is about to perform a major task in the game. As another example, the congestion control module can estimate that available network resources will reduce significantly. Upon being notified of such changes, the application-level service can make appropriate changes (e.g., prompting the user to save the game status, reducing resolution of the game display, etc.) so as to avoid undesirable loss of content or interruptions.

Figure 3:
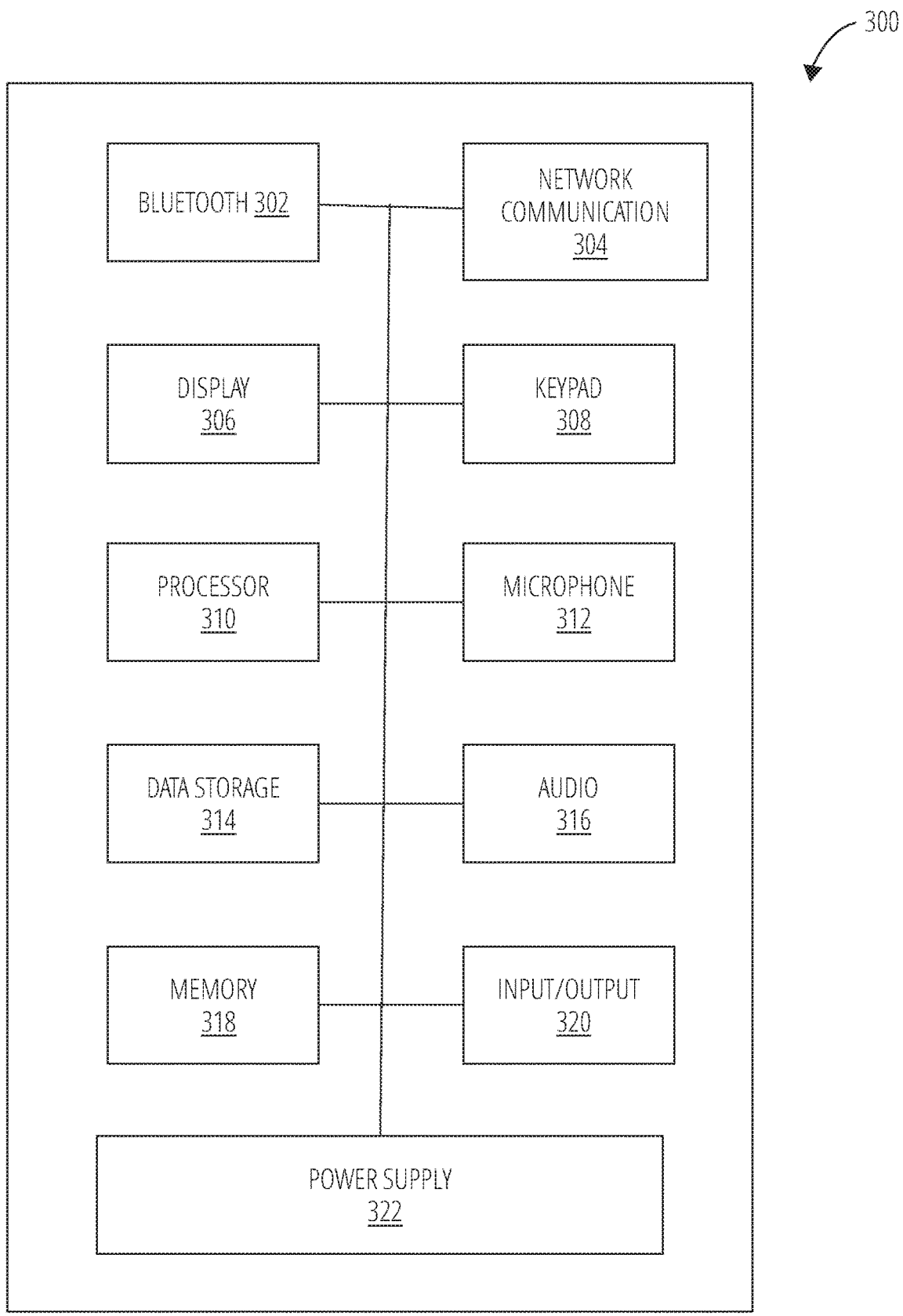
FIG. 3 is a block diagram of a representative mobile device that can engage in network condition estimation and change notification in accordance with embodiments herein.

FIG. 3 is a block diagram of a representative mobile device that can engage in network condition estimation and change notification in accordance with embodiments herein. Mobile device 300 typically includes a processor 310 for executing processing instructions, a data storage medium component 314 (e.g., hard drive, flash memory, memory card, etc.), volatile memory and/or nonvolatile memory 318, a power supply 322, one or more network interfaces (e.g., Bluetooth Interface 302; and Network Communication Interface 304, which enables the mobile phone to communicate by transmitting and receiving wireless signals using licensed, semi-licensed or unlicensed spectrum over a telecommunications network), an audio interface 316, a display 306, a keypad or keyboard 308, a microphone 312, and/or other input and/or output interfaces 320. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP or Diameter protocol clients capable of generating, transmitting and interpreting syntactically correct SIP or Diameter protocol messages. SIP clients permit the mobile device to register with and communicate via the IMS network. Notably, the memories can store the communication congestion module and client-side application noted above.

Mobile device 300 may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, mobile gaming devices, portable medical or surgical units (such as automatic defibrillators and health diagnostic units), infrared devices, handheld computers, laptop computers, wearable computers, tablet computers, pagers, integrated devices combining one or more of the preceding devices, and/or the like. Of course the mobile devices can also include vehicles (such as drones or autonomous vehicles), mobile robots (such as those within a manufacturing facility or product warehouse), and so forth.

Mobile device 300 may connect to a telecommunications network via a trusted radio access network (RAN) or an untrusted RAN. A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

FIG. 4 shows an example of a wireless communication operating system 400 where techniques in accordance with one or more embodiments of the present technology can be applied. A wireless communication operating system 400 can include one or more base stations (BSs) 406, 406, one or more wireless or mobile devices 402, 404, 410, 412 (such as mobile device 300), and a core network 414. A base station 406, 408 can provide wireless service to mobile devices 402, 404, 410, 412 in one or more wireless sectors. In some implementations, a base station 406, 408 includes directional antennas to produce two or more directional beams to provide wireless coverage in different sectors.

The core network 414 can communicate with one or more base stations 406, 408. The core network 414 provides connectivity with other wireless communication systems and wired communication systems. The core network 414 may include one or more service subscription databases to store information related to the subscribed mobile devices 402, 404, 410, 412. A first base station 406 can provide wireless service based on a first radio access technology, whereas a second base station 408 can provide wireless service based on a second radio access technology. The base stations 406 and 408 may be co-located or may be separately installed in the field according to the deployment scenario. The mobile devices 402, 404, 410, and 412 can support multiple different radio access technologies. The techniques and embodiments described in the present document may be implemented by the base stations of wireless devices described in the present document.

It can be appreciated that the disclosed technology can be implemented in various embodiments to provide notifications to application-level services with respect network condition changes based on physical-layer information. As compared to conventional congestion control and avoidance techniques, the use of physical-layer information allows the application-layer services to perform real-time tracking of fast-changing cellular network conditions, thereby achieving high bandwidth performance, low latency, and low jitter. The disclosed techniques allow the application-layer services to provide deterministic network experience to users.

The disclosed and other embodiments, modules and the functional operations described in this document, such as the congestion control module, can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A computer-implemented method for providing deterministic network status data to application-level services, the method comprising:
   providing a set of interfaces to an application-level service deployed in part on a user device to enable the application-level service to gain direct visibility to physical layer information,
   wherein the set of interfaces is configured to provide a notification to the application-level service regarding a real-time or near real-time change in network conditions relevant to the application-level service based on the physical layer information;
   receiving a registration request from the application-level service to register for the notification;
   obtaining the physical layer information from an operating system of the user device;
   estimating the network conditions based on physical layer information; and
   notifying the registered application-level service of the real-time or near real-time change in the network conditions based on the estimated network conditions,
   wherein the application-level service comprises a real-time or near real-time service that requires high bandwidth and low latency, wherein the notification causes the application-level service to execute an action, and wherein the action is to provide a notification to a user of the user device of an increase in latency or a decrease in bandwidth.

2. The method of claim 1, wherein the network conditions comprise at least one of (1) an upcoming mobility event, (2) an amount of available network resources, (3) or a radio link condition, wherein the user device includes Fifth-Generation (5G) New Radio (NR) technology.

3. The method of claim 1, wherein the change in the network conditions indicate a service interruption to the application-level service, wherein the application-level service is a game, and wherein the notification causes the game to save or pause a currently running instance of the game.

4. The method of claim 1, comprising:
   obtaining the physical layer information from a base station that is in communication with the user device.

5. The method of claim 1, wherein the physical layer information comprises at least one bandwidth value, a congested level, a retransmission rate, or a reference signal measurement value.

6. The method of claim 1, wherein the notification comprises a maximum bandwidth value or timing information for a data transmission.

7. A wireless communication device, comprising:
   a processor; and a memory including processor-executable instructions stored thereon, the processor-executable instructions upon execution by the processor configures the processor to:
     provide a set of interfaces to an application-level service deployed in part on the wireless communication device to enable the application-level service to gain direct visibility to physical layer information, wherein the set of interfaces is configured to provide a notification to the application-level service regarding a real-time or near real-time change in network conditions relevant to the application-level service based on the physical layer information;
     receive a registration request from the application-level service to register for the notification;
     obtain the physical layer information from an operating system of the device;
     estimate the network conditions based on physical layer information; and
     notify the application-level service of the real-time or near real-time change in the network conditions based on the estimated network conditions,
     wherein the application-level service comprises a real-time or near real-time service that requires high bandwidth and low latency, wherein the notification causes the application-level service to execute an action, and wherein the action is to provide a notification to a user of the user device of an increase in latency or a decrease in bandwidth.

8. The wireless communication device of claim 7, wherein the network conditions comprise at least one of (1)

an upcoming mobility event, (2) an amount of available network resources, (3) or a radio link condition.

9. The wireless communication device of claim 7, wherein the change in the network conditions indicate a service interruption to the application-level service.

10. The wireless communication device of claim 7, wherein the processor is configured to obtain the physical layer information from a base station that in communication with the device.

11. The device of claim 7, wherein the physical layer information comprises at least one of a bandwidth value, a congested level, a retransmission rate, or a reference signal measurement value.

12. The device of claim 7, wherein the notification comprises a maximum bandwidth value or timing information for a data transmission.

13. A non-transitory computer readable storage medium storing computer readable code, the code, when executed by a processor, causing the processor to implement a method that comprises:
  providing a set of interfaces to an application-level service deployed in part on a user device to enable the application-level service to gain direct visibility to physical layer information,
  wherein the set of interfaces is configured to provide a notification to the application-level service regarding a real-time or near real-time change in network conditions relevant to the application-level service based on the physical layer information;
  receiving a registration request from the application-level service to register for the notification;
  obtaining the physical layer information from an operating system of the user device;
  estimating the network conditions based on physical layer information; and
  notifying the registered application-level service of the real-time or near real-time change in the network conditions based on the estimated network conditions,
  wherein the application-level service comprises a real-time or near real-time service that requires high bandwidth and low latency, wherein the notification causes the application-level service to execute an action, and wherein the action is to provide a notification to a user of the user device of an increase in latency or a decrease in bandwidth.

14. The non-transitory computer readable storage medium of claim 13, wherein the network conditions comprise at least one of (1) an upcoming mobility event, (2) an amount of available network resources, (3) or a radio link condition.

15. The non-transitory computer readable storage medium of claim 13, wherein the change in the network conditions indicate a service interruption to the application-level service.

16. The non-transitory computer readable storage medium of claim 13, wherein the method further comprises:
  obtaining the physical layer information from a base station that is in communication with the user device.

17. The non-transitory computer readable storage medium of claim 13, wherein the physical layer information comprises at least one of a bandwidth value, a congested level, a retransmission rate, or a reference signal measurement value.

18. The non-transitory computer readable storage medium of claim 13, wherein the notification comprises a maximum bandwidth value or timing information for a data transmission.

* * * * *